(12) United States Patent
Hultqvist et al.

(10) Patent No.: US 11,770,538 B2
(45) Date of Patent: Sep. 26, 2023

(54) METHOD FOR PROVIDING PRUNABLE VIDEO

(71) Applicant: Axis AB, Lund (SE)

(72) Inventors: Sebastian Hultqvist, Lund (SE); Viktor Edpalm, Lund (SE); Axel Keskikangas, Lund (SE); Anton Eliasson, Lund (SE)

(73) Assignee: Axis AB, Lund (SE)

( * ) Notice: Subject to any disclaimer, the term of this patent is extended or adjusted under 35 U.S.C. 154(b) by 44 days.

(21) Appl. No.: 17/398,658

(22) Filed: Aug. 10, 2021

(65) Prior Publication Data

US 2022/0086450 A1 Mar. 17, 2022

(30) Foreign Application Priority Data

Sep. 11, 2020 (EP) .................................... 20195752

(51) Int. Cl.
| | | |
|---|---|---|
| *H04N 19/137* | (2014.01) | |
| *G06V 20/52* | (2022.01) | |
| *H04N 19/114* | (2014.01) | |
| *H04N 19/159* | (2014.01) | |
| *H04N 19/52* | (2014.01) | |
| *G06V 20/40* | (2022.01) | |

(52) U.S. Cl.
CPC .......... *H04N 19/137* (2014.11); *G06V 20/40* (2022.01); *G06V 20/52* (2022.01); *H04N 19/114* (2014.11); *H04N 19/159* (2014.11); *H04N 19/52* (2014.11); *G06V 20/44* (2022.01)

(58) Field of Classification Search
CPC .......... H04N 21/23418; H04N 19/114; H04N 19/137; H04N 19/132; H04N 19/88; H04N 19/159; H04N 19/52; H04N 7/18; H04N 19/177; H04N 19/134; H04N 19/119; H04N 21/8455; H04N 19/136; H04N 21/2353; H04N 19/46; G06V 20/52; G06V 20/40; G06V 20/44
See application file for complete search history.

(56) References Cited

U.S. PATENT DOCUMENTS

| | | |
|---|---|---|
| 5,956,026 A | 9/1999 | Ratakonda |
| 7,760,230 B2 | 7/2010 | Russell et al. |
| 9,325,951 B2 | 4/2016 | Saptharishi |
| 10,134,145 B2 | 11/2018 | Wang et al. |

(Continued)

FOREIGN PATENT DOCUMENTS

| | | |
|---|---|---|
| EP | 3087482 B1 | 11/2019 |
| WO | 2007/111966 A2 | 10/2007 |
| WO | 2007/111966 A3 | 4/2008 |

OTHER PUBLICATIONS

Extended European Search Report dated Mar. 11, 2021 for European Patent Application No. 20195752.9.

(Continued)

*Primary Examiner* — Tsion B Owens
(74) *Attorney, Agent, or Firm* — Volpe Koenig (57) ABSTRACT

A method for encoding a video stream for the provision of prunable video data, comprising identifying, in the video stream, a first event-generating occurrence in one or more frames of the video stream, and, in an encoder, using the event-generating occurrence to initiate a hierarchical branch extending from a base-layer when encoding the video stream.

15 Claims, 4 Drawing Sheets

(56) References Cited

U.S. PATENT DOCUMENTS

| | | |
|---|---|---|
| 2003/0210261 A1 | 11/2003 | Wu et al. |
| 2003/0210886 A1 | 11/2003 | Li et al. |
| 2006/0152636 A1 | 7/2006 | Matsukawa et al. |
| 2011/0170615 A1* | 7/2011 | Vo .......................... H04N 19/85 375/E7.076 |
| 2012/0131139 A1* | 5/2012 | Siripurapu ............ G06F 16/951 709/217 |
| 2017/0178343 A1 | 6/2017 | Maranatha et al. |
| 2017/0351922 A1* | 12/2017 | Campbell .............. H04N 19/37 |
| 2020/0104294 A1* | 4/2020 | Alas .................... G06F 16/2365 |

OTHER PUBLICATIONS

Partial European Search Report dated Feb. 12, 2021 for European Patent Application No. 20195752.9.
Ramzan et al., "An efficient optimisation scheme for scalable surveillance centric video communications," Signal Processing: Image Communication, vol. 24, Issue 6, pp. 510-523 (Jul. 2009).
Zgaljic et al., "Surveillance Centric Coding," (Sep. 2008).

\* cited by examiner

Fig. 7B

METHOD FOR PROVIDING PRUNABLE VIDEO

FIELD OF INVENTION

The present invention relates to a method for providing prunable video, and more in particular to a method for processing and encoding a video stream such that it is prepared for pruning.

TECHNICAL BACKGROUND

The use of video surveillance is steadily increasing, and with it comes issues related to storage of video data. Video data of decent quality consumes storage space, both locally in a surveillance camera as well as in centralized storage (such as cloud storage), and storage space is always associated with a cost. Video data often needs to be stored until: 1) it has been reviewed and deemed unimportant; or 2) the time period during which it could have been relevant has passed. For some installations the time period in question may be set by legislation. The general rule often applied is to store the video data as long as possible, and once there is no more storage space available some kind of pruning scheme is applied. Pruning refers to the process of removing video frames or video sequences from a video file with the purpose of reducing a file size, and in some technical descriptions it is referred to as "thinning".

The pruning scheme may typically be a straightforward FIFO (first-in-first-out) approach, where the oldest video data is deleted. This scheme may be refined by adding a level of importance to some video sequences, such that they are kept longer. Other pruning schemes may also involve decreasing the quality of the video data in order for it to be less space-consuming while still allowing for parts of each stored video sequence to be kept (as long as possible), although this is an approach that requires processing power. In this version the planned deterioration in quality may be based on the age of the video date, as disclosed in U.S. Pat. No. 6,813,312 by the present applicant. Examples of this include pruning P-frames in a regular video stream comprising I-frames and P-frames. Any of these may involve also taking the video content into account, e.g., by deleting stored video not containing any motion. Automated video surveillance often is activated as a result of motion being detected in the surveilled scene, in which case most video data stored will contain motion, making this last approach somewhat limited in its effect.

It is preferable that pruning of video data can be performed without analyzing the actual image data, i.e., without decoding the video data, since that would be a labor-intensive process in terms of computational load and thereby time and energy.

Hierarchical video coding is an encoding technique in which encoded images are arranged in layers, and it is a technique commonly used in scalable video coding. In such an application the different layers may contain video of different temporal or spatial resolution, and depending on bandwidth or client devices a transmitted video may be tailormade from the hierarchical structure. See e.g., "Overview of the Scalable Video Coding Extension of the H.264/AVC Standard" (Schwarz et al., "IEEE Transactions on circuits and systems for video technology, Vol. 17, No. 9, September 2007).

The present specification aims at providing an improved method for generating prunable video data.

SUMMARY

In an effort to eliminate or alleviate drawbacks in existing technology and to achieve the stated goal, an improved method of encoding a video stream for the provision of prunable video data is set forth herein. The method comprises identifying, in the video stream, a first event-generating occurrence in one or more frames of the video stream, followed by, in an encoder, using the event-generating occurrence to initiate a hierarchical branch extending from a base-layer when encoding the video stream.

What is to be described could in practice be performed on already recorded video data, by means of a transcoding procedure. Still, particular advantages and the expected use are related to the use in video cameras. Therefore, the description will be given in the context of a video camera. In such a case, referring the above method, the video stream has been acquired using an imaging unit and an image sensor of the video camera. Event-detection algorithms are used to detect the events as the images of the video stream passes through an image processing pipeline. Following the image-processing pipeline the stream enters an encoder for encoding according to the particular encoding standard used in that encoder. When encoding, data (such as data concerning a detected event) may be used as input in order to control the encoding process. In the absence of detected events the encoded stream will only comprise a base-layer, as would be the case for a regular encoder. However, a detected event of interest is used as input to instruct the encoder to generate a hierarchical branch extending from the base-layer. The generation of a hierarchical branch as such does not necessarily provide a solution, yet having the branch being generated as a result of an event of interest will facilitate localization of that particular event, and furthermore to streamline a pruning process at a later stage.

In one or more embodiments the event-generating occurrence corresponds to a motion detection, an object detection, or an object identification. There are numerous image processing algorithms that may be used when identifying events taking place in an imaged scene, ranging from a straightforward comparison of pixel values to state-of-the-art machine learning algorithms and algorithms based on neural networks. For the present embodiment this abundant amount of possibilities may be used to facilitate different applications of embodiments. Adding to the above list of examples the event-generating occurrence may be more refined, and it is basically only limited to what may be detected or identified, including actions of an object (individual acting aggressively, talking loudly, car driving fast, etc.) as well as attributes of objects (person with a red shirt, car with a blue tint, etc.) More than one type of event-generating occurrence may be active in parallel.

In one or any embodiments described above or below, the initiated hierarchical branch may be continued until the event-generating occurrence is over, a predetermined time has passed since the initiation, a predetermined number of frames have been encoded following the initiation, or a new intra-coded frame is inserted in the stream. This selection of alternatives is not exhaustive, but it is considered to represent the most likely options. Starting from the last example; when a new I-frame is to be inserted in the stream, this is done in the base-layer and it is, simply put, executed when the inter-coded frames are becoming too large (the changes in the image has grown too large since the last intra-coded frame, I-frame). This encoding feature provides an upper limit for the branch length, but it is not necessarily a fixed length since it may vary, e.g., with camera settings and what occurs in the scene. In such cases the length of a branch may also be limited to a particular amount of time or a particular number of frames, in order to provide full predictability.

It is probably noticed that nothing mentioned in the above paragraph refers to the event responsible for initiating the hierarchical branch in the first place. In some embodiments it will be enough only to have a single branch of image information concerning an event. In other embodiments however, a new hierarchical branch may be initiated if the event-generating occurrence is still ongoing following a finalization of the branch, in accordance with one of the alternatives above. It may be relevant to understand that the information concerning that the event is still ongoing is known from the image processing pipeline, meaning that a new branch may be initiated immediately, without losing a single image frame of data.

A scene development that may occur is that a second event is detected while the first event is still ongoing. This may correspond to a further individual entering the scene, the individual causing the first event showing a facial image, etc. In one embodiment this may result in new hierarchical branch being initiated, referring also to the base-layer. According to another embodiment it may result in a new branch being initiated, but this time extending from the present branch and essentially being generated on a further hierarchical level.

In some embodiments the start of such a new branch, referring to the base-layer or to the ongoing branch, while there is an ongoing event may be associated with conditions. One such condition is that the second event-generating occurrence has a higher priority, according to a predetermined prioritization, than the first event-generating occurrence, in which case a new branch will be started. Otherwise the first branch will be maintained instead.

The above embodiments represent different approaches, yet in any embodiment a branch may be marked with a tag corresponding to the event-generating occurrence, preferably in the form of metadata that may be accessed even if the video is in an encoded and/or a fully or partly packed state, to be further explained in the detailed description. If there is more than one event at the time, more than one tag may be added to the same branch. Consequently, although the embodiment regarding from where the second branch extends may seem different, they will enable the same efficient pruning process. A tag may represent a description of the content of a video frame or a video sequence, and as such every possible content that is possible to detect may be added as a tag, based on the requisites of a particular application. Instead or, or as an addition to, representing the content, a tag may represent the priority of the content (such as high/low, or according to any scale) also this according to the requisites of a particular application.

One or more embodiments also comprise actually pruning the video data by means of discarding a base-layer, partly or in full, or some of the hierarchical branches, wherein the video data is pruned prior to being transferred to a storage, or wherein the video data is pruned post being transferred to a storage, or wherein the video data is pruned prior to leaving the video camera. Returning to the issue of pruning this will also flare out to a number of embodiments, each having its advantageous effects, and each being suited for a particular situation. A common approach in relation to pruning is to perform pruning either at regular intervals or after a certain specific time of storage (e.g., 24 h, one week, one month, etc.), in which case the video data is most likely already in a storage, or even a long-term storage, e.g., at a server on in a cloud. Consequently, in one embodiment the video data is pruned after it has been transferred to such storage. In this way a space available in the present storage will increase, and in applications where the storage volume is associated with a cost, the cost will be reduced. Another approach is to prune the video data already before it has been transferred to such storage, which would be comparable to performing a screening of the video data with the purpose of reducing the size while still maintaining video information believed to be important. A situation could be that the video data has been temporarily stored in a storage of the video camera or in a local storage and as it is transferred to a centralized storage (server, cloud) the pruning is performed. In still another embodiment the video data may be pruned before even leaving the video camera. This may be an appropriate approach in at least three situations. The first is that the storage space available in the video camera is limited and that the amount of video data closes in on or is projected to increase above that limit. The second situation could be that the bandwidth for transfer of video data is limited, temporarily or statically, and by performing a pruning already in the camera the transmitted stream will require less bandwidth for successful transmission, resulting in that important video information may still be transmitted. The third situation is that the cost of data transfer is based on file size and that the cost is substantial, in which case a reduction of data prior to transfer would be beneficial.

It is preferred that the tags are used as an input during the pruning. This may be made according to a predetermined scheme, e.g., by pruning video sequences of lower priority. The priority may be based on tags representing a level of priority, yet for embodiments where the tags represent the content of a video sequence, a user may set a priority template based on content, and the pruning may be performed based on this predetermined priority template. A user may also select particular content (tags) to be either pruned or not pruned during a particular pruning session, and select content that should be exempt from pruning.

To further support a determination of authenticity of the video the method may further comprise generating a first hash value based on the whole video stream and generating a second hash value based on all or a selection of hierarchical branches. Furthermore, it may comprise signing both the first and the second hash, in order to allow verifying the authenticity of the video both when not pruned and when pruned.

According to another inventive concept, a video camera is configured to perform the method according to any embodiment as described above or below. The video camera comprises imaging optics, and image sensor, an image processing pipeline, with associated detection algorithms, and a video encoder. The video camera further comprising a communication interface for transmitting the video stream.

A further scope of applicability of the present embodiments will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description. Hence, it is to be understood that the claims are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

Figure 1:
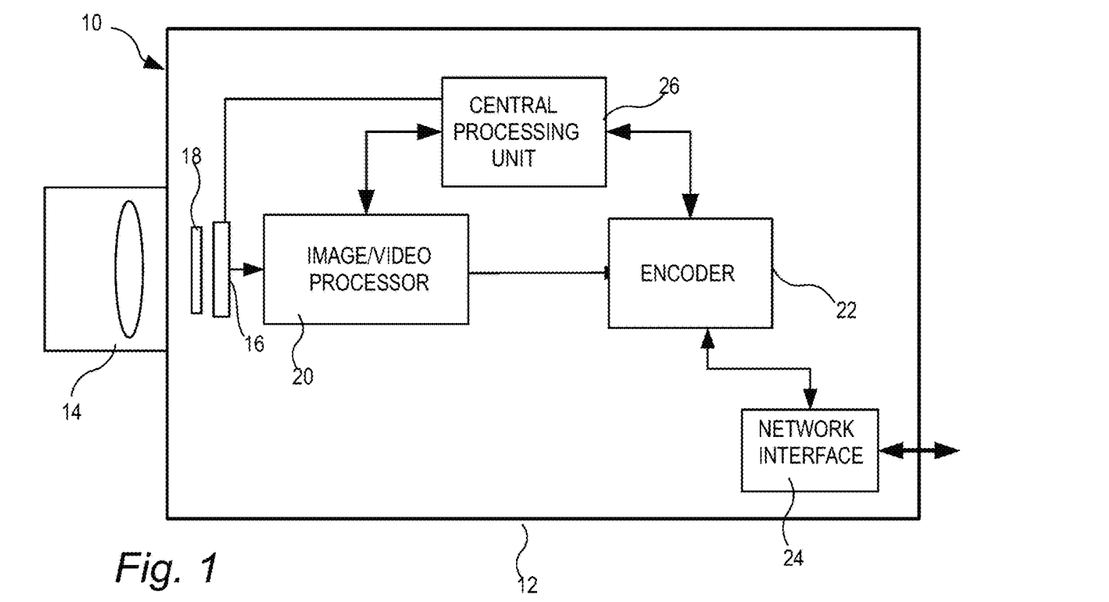
FIG. 1 is a schematic of a video camera that may be used when performing the present teachings herein according to one or more embodiments thereof.

FIG. 1 illustrates a video camera which can be used when performing a method according to one or more embodiments. It should be noted that the description to follow is rudimentary, since present invention does not reside in the area of camera design, and furthermore there are numerous different ways of describing the interior components and functionalities. The video camera 10 has a housing 12 and some imaging optics 14. The imaging optics 14 focuses an image of a scene on an image sensor 16. An IR-cut filter 18 may be arranged in front of the image sensor 16 to prevent IR radiation from reaching the image sensor during day-mode imaging, which would otherwise distort color imaging. The filter 18 may be arranged on an actuator, not shown, enabling for it to be inserted and retracted from its position in front of the image sensor, thus making it possible for the camera to switch to night-mode operation where also IR-radiation is allowed to reach the image sensor to enhance the total amount of incoming radiation. The image collected is forwarded to an image processing pipeline (IPP) 20, and if not done in an image sensor module the image processing pipeline will generate an "true" image from the raw sensor data, including noise reduction, demosaicing, white balance, image transformation, etc. Following the IPP 20 the image stream is forwarded to an encoder 22, in which the image data is encoded according to a predetermined standard, such as H.264 (AVC), H.265(HEVC), H.266 (VVC), EVC, VP9, AV1 etc. Following the encoder 22 the encoded video stream may be transmitted from the video camera via a network interface 24, if available. A central processing unit 26 controls the components and functionality. There are internal memories, volatile and non-volatile for ensuring the operation, but these are not shown in FIG. 1. It has been stressed that the illustration of FIG. 1 is a schematic simplification, which should be readily understood. It should also be understood that the video camera does not have to include every component within the same housing. As an alternative example an imaging unit, at least comprising the imaging optics, may be separate from a processing unit, at least comprising the encoder. The two units may be interconnected via a wire (which may be preferred for performance) or via a wireless connection. Such solutions are commonly used where it is desired to provide a small imaging unit that could be arranged in a small or concealed location.

In some embodiments, one or more image processing algorithms of the camera are used to identify events occurring in the imaged scene. Such an algorithm may be a motion detection algorithm, a face detection algorithm, and object detection algorithm, etc. With the introduction of deep learning and various evolutions thereof, it is close to the truth to claim that everything that can be imaged can be detected (or classed, identified, recognized, etc.), and to cite an exhaustive list of each algorithm is far beyond the scope of the present disclosure. Still, as will be evident from the description, the embodiments will be inert to the type of detector/identifier/classifier used. In a situation where anything and everything (or at least many things) may generate an event in an imaged scene, it will also be possible to categorize the events based on the character of the event. This is a feature that is very useful in a second sequence of, namely pruning of the acquired video data. By tagging an image sequence based on the content of the event it images, it will be possible to prune the acquired video data with accuracy.

Figure 2A:
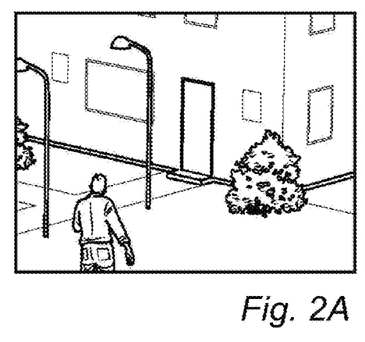
FIGS. 2A-D is sequential view of four points in time showing how a scene alters.
Figure 2B:
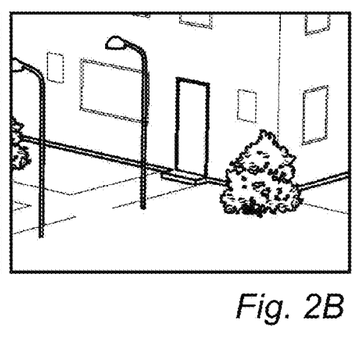
Figure 2C:
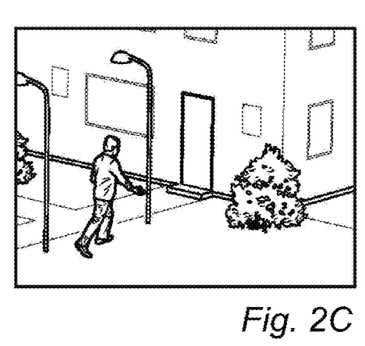
Figure 2D:
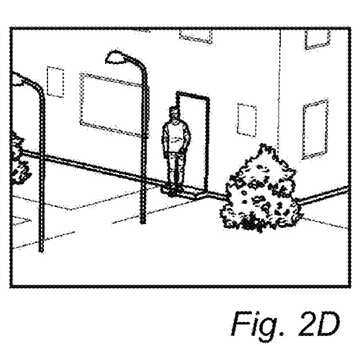

Embodiments will now be described, and to support this description FIG. 2 will first be described. FIG. 2 is a sequential view illustrating sequential events in a video from a camera monitoring a block of flats. In the first view, FIG. 2A, the scene goes from being empty to contain an individual with the back towards the camera. This first event will be referred to as Sequence I. In FIG. 2B the person has left the scene, the camera does not cover part of the pathway, and the scene is again empty, representing Sequence II. Notably, what is considered to be "empty" is based on the parameters of the present description. In other applications and embodiments, the motion of leaves in the brushes or the mere presence of a house may be something that would be interesting, in which case the scene would not be "empty" in the sense that there is no event-generating activity. For the purposes of the present description, however, the scene of FIG. 2B is empty. FIG. 2C, illustrating Sequence III, the individual reappears in the scene. As mentioned before, this could be detected by a motion detection algorithm, an object classifying algorithm, etc. and for the present description this will be used as an event-generating occurrence. The individual walks towards the door of the building, and when arriving at the door in FIG. 2D, Sequence IV, the individual turns to open the door and displays a front view of a face. This may or may not be used as a discriminator, yet if it is desirable the occurrence could be identified by a face detection algorithm. Following the disclosed sequences, the individual has entered the building and yet again the scene is free from events.

To briefly expand on the categories, they could relate to an activity, such as the general "motion" or the more specific "running", "fighting", a particular object class, such as "people", "vehicles", "animals", and they could also relate to attributes within that particular class, such as "faces", "cars", "dogs", but they could also be combined to involve action of a particular object, such as "person running", "car driving fast", as well as relational situations, such as "person approaching gate" etc. In short, and as stated before, anything that could be identified could be used in a categorization scheme, and what is actually used will depend on the particular installation and preferences of the operator. Further examples include input from external sensors. This could be external sensors reacting to a possible event. A very specific example could be a checkout line of a supermarket where each transaction could trigger an event, or other direct input from an employee (pressing an "event" button, and alarm button, etc.). Further down the line, the categorization may be used in an implementation of a pruning strategy, as will be discussed.

In the present example the object is a walking person. It could equally well be any other distinguishable (detectable or recognizable) object, moving or stationary, depending on the particular monitoring situation.

Figure 3:
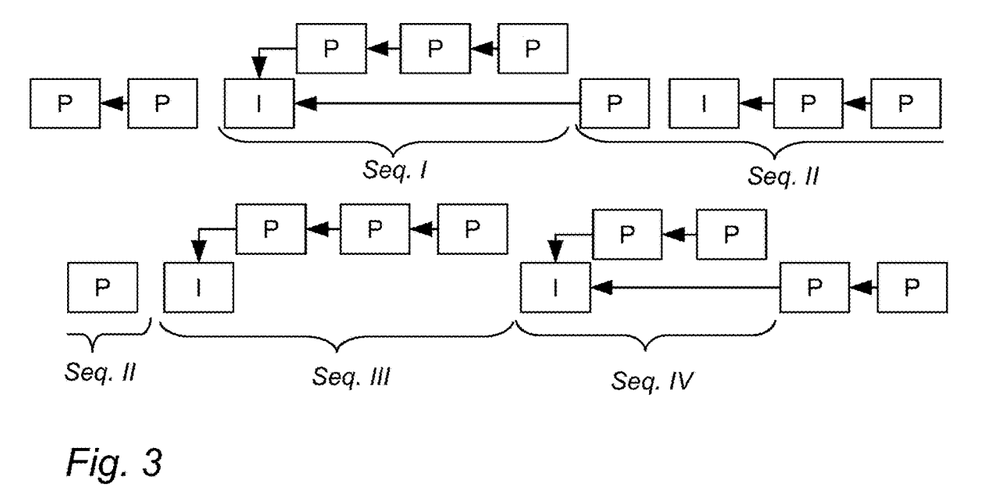
FIGS. 3-5, in turn, exemplifies how an image stream of the scene as described in FIGS. 2A-D may be encoded according to three different embodiments.

FIG. 3 illustrates encoding of a video stream containing the events of FIGS. 2A-D. The illustrated stream is merely illustrative, and normal features such as frames per seconds, total number of images in a group of pictures (GOP), distribution of intra-coded frames (I-frames) and inter-coded frames (P-frames) etc., are not to scale or realistic in any quantitative way. A feature to notice in FIG. 3, however, is the hierarchical structure, with a base-layer (the lower part of the imaged stream) and an enhanced layer in the upper part of the illustrated stream. It is common in the encoding into hierarchical streams to have different properties in terms of resolution, frames per second, and other image or encoding properties, yet in the present embodiment such parameters may be identical, since the purpose is not to generate a scalable video coding or corresponding feature, but merely to provide a video stream with properties better suited for pruning purposes.

The stream illustrated in FIG. 3 starts with a number of P-frames, preceded by an I-frame (not shown). This corresponds to the time period preceding sequence I, where nothing generating an event occurs. As the individual enters the imaged scene in FIG. 2A this is detected by a motion detection algorithm (or other algorithm) and further down an image processing pipeline this results in the initiation of a hierarchical branch being generated, as shown in FIG. 3. The branch starts with an I-frame at the base-layer and continues with P-frames in the enhanced layer.

At this stage FIG. 3, and subsequent drawings, may be misinterpreted unless a clarification is made. In FIG. 3 there are only three P-frames in the hierarchical branch. This is an arbitrarily selected number merely schematically representing any number of frames. In reality the number of frames could be limited by a timer, allowing the branch to continue for a certain time period or for a certain number of frames at a certain frame rate. It could also, or as a supplement to what was mentioned before, be limited to the time during which the event is ongoing. As a last example in this non-exhaustive list it could be limited by regular encoding parameters, e.g., when the P-frames increase in the size (as it will generally do with distance in time from the initializing I-frame and the resulting increasing cost of encoding) a new I-frame may be forced into the stream by the encoder (in a most regular fashion). This I-frame will be generated in the base-layer. If the event is still ongoing at the time of interruption of the branch, a new hierarchical branch may be initiated. Returning to the present case as illustrated, the person exits the imaged scene, and the branch is finalized and with that the stream returns to the base-layer with a P-frame (in this case) referring back directly to the I-frame that initiated the branch.

Sequence II results in frames encoded in the base-layer only. What was discussed regarding the number for frames etc. of the first branch is also valid for the illustrated encoded frames of this sequence, as for the remaining sequences. As the individual reappears in the scene, sequence III is initiated with a new I-frame and a hierarchical branch. In this first embodiment the following I-frame represents the start of sequence IV. Leaving the present embodiment shortly, the same structure could appear during one and the same event (i.e., during one and the same sequence), when the second branch is timed out resulting in that the encoding returns to the base-layer, where it immediately discovers that the event (e.g., "individual in scene", or "motion in scene") is still ongoing and returns back to a new hierarchical branch. The information that the event is still ongoing may emanate from the detection algorithm, and in that sense, it is a more of a state rather than something that is discovered. Consequently, the structure as illustrated in the start of sequence IV in FIG. 3 could also be the result of the end of the branch for any reason mentioned before, and the immediate start of a new branch which for all intended purposes is a continuation or prolongation of the preceding branch, coupled to the same event.

As the individual enters the door, there is no event, and therefore the branch is finalized, and the encoded image stream returns to the base-layer.

Figure 4:
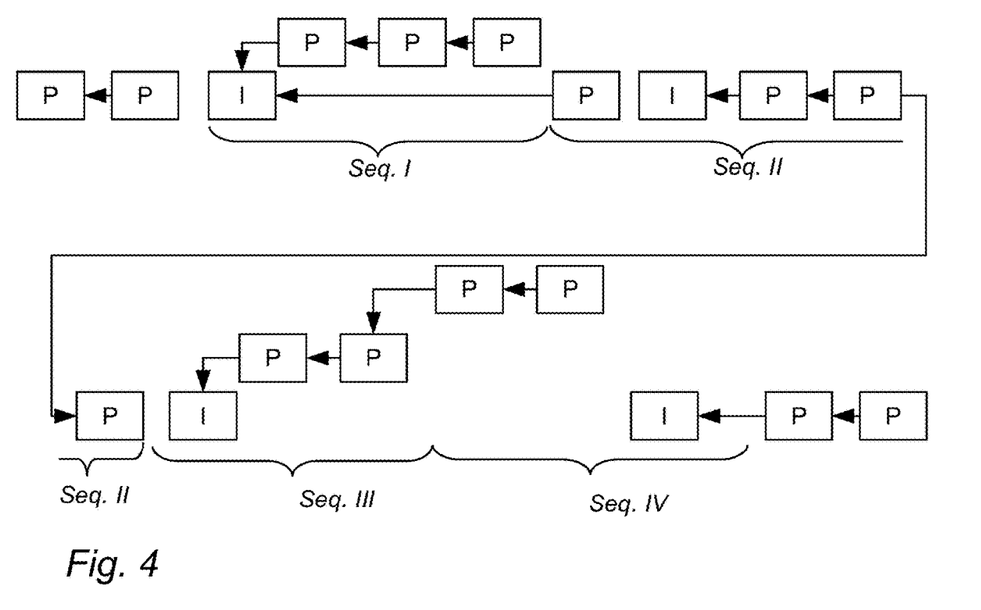
Figure 5:
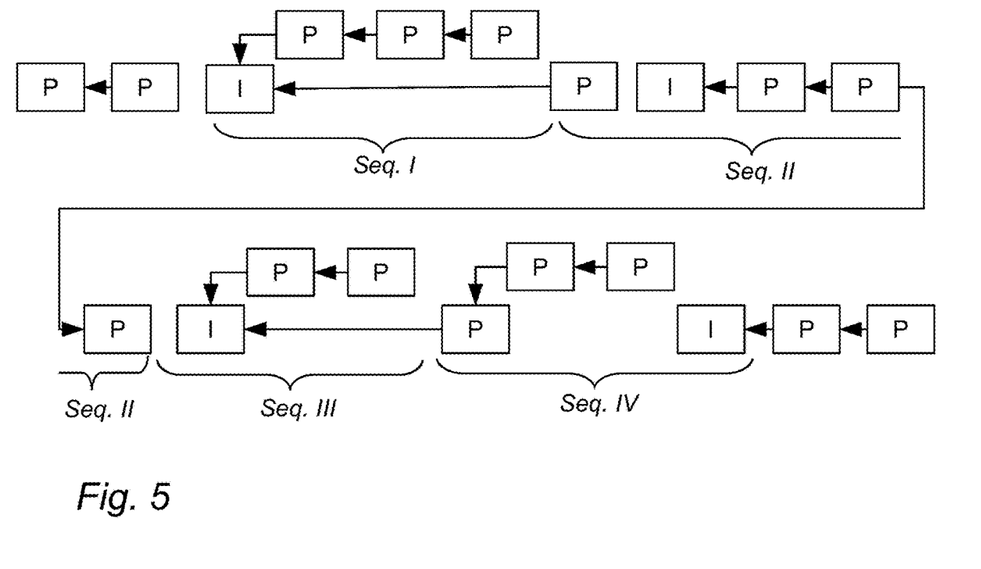

FIGS. 4 and 5 also illustrates the result after encoding of the same scene as FIG. 3, yet with slightly different conditions taken into account during encoding, and consequently two further examples of embodiments. In the embodiment of FIG. 5 it would be possible to prune the video such that sequence IV is kept while sequence III is deleted while for the embodiment of FIG. 4 the structure results in that sequence III would have to be if kept sequence IV should be kept. However, if both sequences are kept the structure of FIG. 4 is likely to render the size of Sequence III and IV smaller than in FIG. 5, since the size of the first P-frame of Sequence IV in FIG. 5 will be smaller than the corresponding P-frame in FIG. 4.

Starting with FIG. 4. While the evolution of the encoded stream is similar to that of FIG. 3, the detection algorithms also include a face detector and another set of rules. As the individual shows the face is the initiation of sequence IV this results in the initiation of a new branch, enabling for a more delicate pruning at a later stage. This new branch extends from the first hierarchical level and forms a second hierarchical level.

In FIG. 5, on the other hand, there is also a face detector. But instead of adding a further hierarchical level when the face of the individual becomes detectable, as for the embodiment of FIG. 4, the current hierarchical branch is discontinued, and a new branch is initiated.

Figure 8:
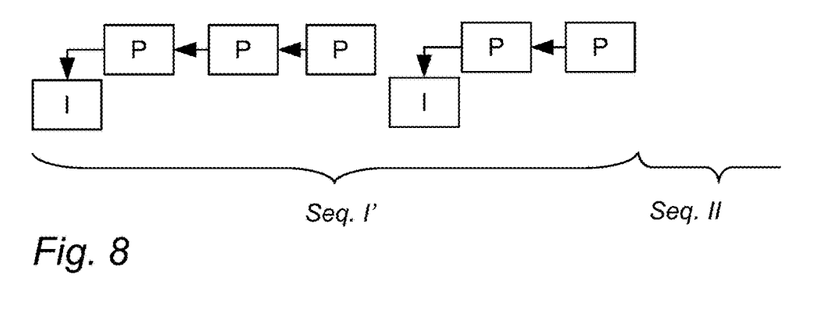
FIG. 8 exemplifies how an event may have a duration spanning more than one group of pictures.

In any embodiment each event may continue over more than one group of images (i.e., one or more I-frames will be generated during the event following the first I-frame). A subsequent I-frame will be positioned in the base-layer, and then a new hierarchical branch may be initiated immediately, wherein the new hierarchical branch is associated with the same event. This is exemplified in FIG. 8, illustrating a situation where a Sequence I', corresponding to Sequence I of previous examples, continues over more than one GOP.

The use of a hierarchical structure will facilitate an efficient pruning procedure at a later stage, as will be described. Furthermore, each type of event may be tagged, with one or multiple tags.

The present teachings provide a significant advantage in regard of signed video. Due to the structured hierarchical approach the effects of a pruning session will be fully predictable, i.e., pruning is performed according to the predetermined scheme. This means that it will be possible, without any additional effort, to sign the video in a way such that there may be signed video provided in every step of the lifetime of the video data, i.e., such that the authenticity of every permutation of video data remaining following pruning may be validated. There are several approaches for performing such a hash/sign for a video containing a number of video sequences, and it is not the purpose of the present disclosure to state known processes, and the preferred approach may vary with the desired pruning process. As a general guideline, well known to the skilled person, the main objective is to achieve the goal of having authenticable video for a number of pruning scenarios while minimizing the processing needed for reaching that goal. Any hierarchical branches may be individually hashed and signed as well (or on a group or category level if the processing load is considered to be too high), enabling validation for these. The base-layer may be hashed and signed, and the full video (i.e., the original video before any pruning) may be hashed and signed as well. Hashing of the entire video is preferably performed utilizing already calculated hashes from previous video frames and video sequences, in a sequential manner, so as to gain synergistic effects and to reduce processing load.

There is no need to separately hash and sign the base-layer in isolation, which will be evident when understanding the later pruning procedure. In short, before pruning the full video stream will be available (and this is hashed and signed). After pruning, portions of the base-layer will have been removed while the branched off enhanced level will be maintained. Each branch will be hashed in isolation or as part of a group of branches, enabling authentication of the remaining video. Consequently, while it is possible to hash and sign the base-layer in isolation, there is presently no use-case where such an option would be preferable. In a slightly more elaborate embodiment, there are several different event generating occurrences, such as exemplified by the individual showing the face, and in such embodiment, branches emanating from different categories of events may be tagged differently. This means that a pruning process may target specific categories of events, which also means that there may be multiple hashing/signing structures to account for the particular configurations of events. Notably, each sequence or branch may have several tags associated with it, e.g., a scene showing a face (tag) will also show an individual (tag) and may also show a moving car (tag) etc. In a generalized embodiment the number of signed versions could correspond to the number of categories. Branches (also referred to as sequences/events/hierarchical P-frame structures) having the same category during the same time could be combined prior to being hashed and signed, or hashed in a sequential manner and signed. There is great flexibility when it comes to this stage of the process, and the parameter that may be said to govern the process is the step of signing the data. Presently, signing data is an expensive process in terms of computing power. Imagine a typical situation with a frame rate of 60 frames per seconds, and a number of event categories needing to be signed, separately or in combination. This is possible, but the computational load would be significant. That is where the initial hashing of the data becomes an important feature. The enormous amount of data may be reduced significantly, by several orders of magnitude, while still maintaining a 1-to-1 relationship with the original data in terms of authenticity, and the computational load associated with adding the signature will be reduced. The appropriate scheme relating to which combination of sequences or event categories is the most appropriate to hash will be governed with the expected use of the video data. If each branch or class of branches is hashed separately, it would theoretically be possible to inject a replacement branch (e.g., a branch from a previous day) and everything would appear fine. Adding a signature to several sequences in combination, across event categories, would make such a tampering effort detectable, yet once the pruning has been performed the signature of the full image may no longer be valid. This problem could be circumvented by hashing and signing branches of the same category in combination, only, or in combination with signing them separately and/or signing the full image. Preparing for any possibility results in numerous combinations, and way of reducing the computational load would be to sign on the level of group of images (GOPs) rather than on individual images, or on even more general levels still. The strategy used is not essential for the present invention as such, and as mentioned, the most appropriate one will most likely depend on knowledge of how the image data will be handled downstream. Despite this lengthy description concerning hashing and signing it is far from exhaustive, nor is the subject as such a key-issue of the present teachings.

For convenience it may be suitable to add information concerning the assigned category to the signature, such that it is readily accessed at a time of pruning. Typically, a hash would be generated prior to the stream leaving a kernel space (a secure environment within which tampering is rendered difficult due to hardware and hardware configurations) of the camera, for maximum security. The application of a hash and a signature may preferably be effected immediately following the encoder (i.e., as soon as possible), also for the reason of reducing exposing a video sequence for tampering possibilities.

Figure 6:
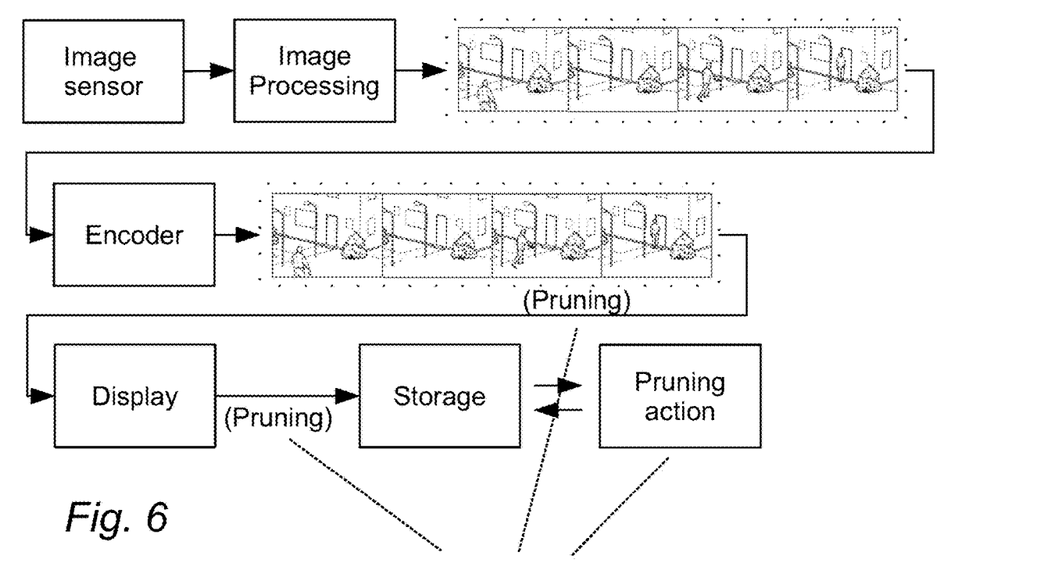
FIG. 6 is a schematic of a flow from image acquisition to potential pruning, illustrating some different embodiments of the present invention.

The thus formed stream may be sent for display (live view) as indicated in FIG. 6. Also, it may be stored in a local storage in the camera and/or to other remote storage (centralized storage, server, a cloud solution, etc.). Any or all of these operations may occur, e.g., the stream may be stored locally as well as centrally, using the same or different rules for the particular storage.

The video data may be pruned at, before, or after any of these operations. It is likely that an operator monitoring the live view would like to have the non-pruned scene, but it may otherwise be pruned prior to leaving the video camera. Such an approach may be advantageous in situations where the bandwidth is temporarily or permanently low, or when video data is stored on a limited memory of the camera. Another alternative could be to prune the video data before transferring it to the storage (local and/or remote) in order to provide for space-efficient storage. A third option could be to prune the video data according to a pruning scheme. The pruning scheme may be based on time in storage, e.g., after two weeks a pruning operation is performed, regardless of a present storage capacity. Also, or instead, the pruning operation could be based on need; if there is limited storage capacity available the pruning operation could be triggered to improve the situation.

Figure 7A:
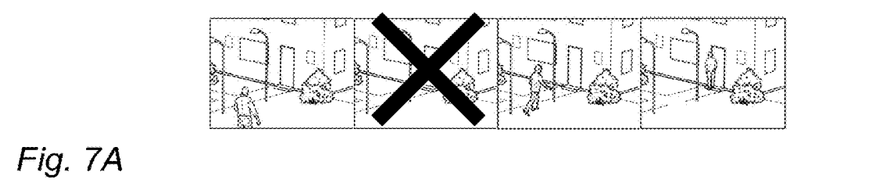
FIGS. 7A and 7B visualize the effects of a pruning according to two different pruning approaches.
Figure 7B:
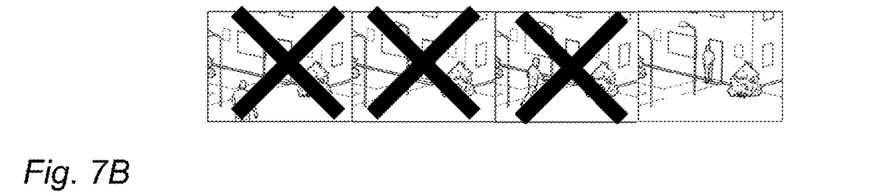

The pruning is illustrated in FIGS. 6 and 7 as well, and it basically consist in deleting all encoded frames corresponding to the base-layer, thus being of lower relevance by definition, which is readily done. If an un-interrupted timeline is to be maintained only the P-frames of the base-layer are deleted. This is convenient, but since I-frames contain more unique information and therefore are much larger than P-frames it does not free up a large amount of storage space. In the next step, or as an alternative, also the I-frames of the base-layer (apart from the I-frames being the start of a hierarchical branch) may be deleted. In FIG. 7A it is visualized how a portion of the stream imaging the empty scene may be deleted, while the other alternative visualized in FIG. 7B is that only the part of the stream imaging the face of the individual is kept after pruning. In a situation with two different categories the video data is pruned in the most obvious manner. Should there be a higher number of categories, which could be construed as "important", "non-important", and "possibly important" in a pruning process, the pruning process could follow a more elaborate scheme, and since any category may be identified in the pruning process, any category could be removed in said process. It should be noted that for the purposes of the present teachings pruning could also imply that the quality of the frames or sequences being assigned the less important category is reduced, such that the file size may be reduced, without deleting the frame completely. Presently, this approach is not possible unless the video data is transcoded, which is a procedure that not preferred because of the increased processing required. There is also an issue of previous hashes and signatures will be rendered useless. Even so, the present teachings would enable the solution, whether it is preferred or not. From an authentication standpoint it is possible to transcode and then sign the transcoded video, in which case it would be possible to note the transcoded subviews as less reliable (or at least keep track of where, when and/or by whom they were transcoded and pruned).

The architecture and processing (in terms of hashing and signing) for a video stream generated using the present invention also facilitates deleting corrupt video sequences while still maintaining a signed video that may be authenticated as such. This follows logically from the disclosed embodiments of the invention. The corrupt video data sequences will not be saved, but the structure of the hashing and signing ensures that the remaining part of the video (even after the corrupt video sequences have been removed) can still be authenticated.

From a practical standpoint the pruning is performed as a multistep process. In an example the pruning is to be effected on stored video data in a packed state. In a straightforward approach the video data would be unpacked and decoded before being pruned. This straightforward approach is however unnecessarily computation intensive, and there is a lot to gain from taking advantage of some of the features offered by the present invention, according to embodiments thereof. The first step is to access the categorizations (the tags) with as little effort as possible, which in the examples given may consist in unpacking a video file only to the extent so as to access SEI-headers (or corresponding headers in other standards) in a network abstraction layer (NAL), which is an example of where the category assignments may be stored. Just to briefly address SEI (supplemental enhancement information), SEI messages have been developed to contain various types of data indicating such things as the timing of the video pictures or description of various properties of the coded video or how it can be used or enhanced. What is relevant for embodiments of the present invention is that they may also contain arbitrary user-defined data, e.g., categorizations or tags. By storing tags in such a location, it will be possible to access the tags merely by parsing the headers of the encoded video data, rather than having to decode entire frames, which would then have to be encoded again resulting in an overly cumbersome process.

As a matter of fact, the unpacking of the video data would not have to be complete, since only the uncompressed headers would need to be parsed. This suggested approach does not exclude the use of other approaches, yet it is stressed that the preferred notation with tags is made at a location where as little effort as possible is needed to access the tags. In this context it could be mentioned that there are prior-art solutions where metadata concerning events in the surveillance video is stored as a separate file, e.g., disclosed in U.S. Pat. No. 7,760,230B2. By this, the relevant metadata may consequently be accessed without any processing of video data whatsoever (e.g., when pruning is to be effected), as long as there are references between the two files (the video data file and the metadata file), such as time stamps. This is an approach that is not preferred for the purposes of the present teachings, where video data and metadata (in the form of tags) are preferably stored in the same file. For some embodiments there will be an inherent synchronization between the metadata and the video data, and since the metadata is stored with the video data it will simplify processes such as video editing. Furthermore, the combined data may be transported according to a standard transport protocol, without any tailormade solutions to maintain synchronization between metadata and video data.

For the present technical field and coding standard the use of headers is beneficial, but there is nothing saying that in another application or other standard/format the necessary information could not be stored in a separate file or in another location of the image, file, or data structure. The exact location is not crucial for the invention as such, yet the example has the advantage of not requiring for the video to be decoded in order to be pruned. In a comparison, decoding would be tenfold more resource demanding than a mere unpacking procedure. In the next step the assigned categories are compared with any pruning criteria, and unwanted sequences are discarded. The hierarchical structure enables for clean removal of sequences. Following the pruning the video file may be packed again and left for further storage. The category assignments could also be stored in a metadata file, enabling correlation between category and video sequences.

The invention claimed is:

1. A method of encoding a video stream for the provision of a prunable encoded video stream, comprising,
   in an encoder, encoding frames of the video stream into encoded frames of a base-layer,
   identifying, in the video stream, a first event-generating occurrence in one or more frames of the video stream,
   in the encoder, using the identified event-generating occurrence to initiate a hierarchical branch in an enhanced layer referring to an intra-encoded frame of the base-layer, and
   after initiating the hierarchical branch, encoding frames of the video stream into encoded frames of the enhanced layer, wherein each inter-encoded frame of the enhanced layer refers to the intra-encoded frame of the base layer or to another inter-encoded frame of the enhanced layer.

2. The method of claim 1, wherein identifying the first event-generating occurrence comprises a motion detection.

3. The method of claim 1, wherein identifying the first event-generating occurrence comprises detecting an object.

4. The method of claim 1, wherein identifying the first event-generating occurrence comprises identifying an object.

5. The method of claim 1, wherein identifying the first event-generating occurrence comprises detecting an attribute of an object.

6. The method of claim 1, wherein encoding frames of the video stream into encoded frames of the enhanced layer is continued until: the event-generating occurrence is over, a predetermined time has passed since the initiation, a predetermined number of frames have been encoded following the initiation, or a new intra-coded frame is inserted in the stream.

7. The method of claim 6, wherein a new hierarchical branch is initiated if the first event-generating occurrence is still ongoing following a finalization of encoding frames of the video stream into encoded frames of the enhanced layer.

8. The method of claim 1, wherein a new hierarchical branch is initiated if a second event-generating occurrence is identified.

9. The method of claim 8, wherein the new hierarchical branch relating to the second event-generating occurrence refers to an encoded frame of the base-layer.

10. The method of claim 8, wherein the new hierarchical branch relating to the second event-generating occurrence refers to an encoded frame of the enhanced layer of the hierarchical branch relating to the first event-generating occurrence.

11. The method of claim 8, wherein the new hierarchical branch is initiated only if the second event-generating occurrence has a higher priority, according to a predetermined prioritization, than the first event-generating occurrence.

12. The method of claim 1, wherein each hierarchical branch is marked with a tag corresponding to the event-generating occurrence to which it relates.

13. The method of claim 1, further comprising pruning the encoded video stream by means of discarding the encoded frames of the enhanced layer relating to some or all hierarchical branches, wherein the encoded video stream is pruned prior to being transferred to a storage, or wherein the encoded video stream is pruned post being transferred to a storage, or wherein the encoded video stream is pruned prior to leaving the video camera.

14. The method of claim 1, further comprising
generating a first hash value based on the whole video stream, and
generating a second hash value based on all or a selection of hierarchical branches, and
signing both the first and the second hash, in order to allow verifying the authenticity of the video both when not pruned and when pruned.

15. A camera configured to perform a method of encoding a video stream for the provision of a prunable video stream, comprising:
an encoder, configured to encode frames of the video stream into encoded frames of a base-layer;
an image processor configured to identify, in the video stream, a first event-generating occurrence in one or more frames of the video stream;
the encoder further configured to use the identified event-generating occurrence to initiate a hierarchical branch in an enhanced layer referring to an intra-encoded frame of the base-layer, and
after initiating the hierarchical branch, encode frames of the video stream into encoded frames of the enhanced layer; and
a communication interface configured to transmit the video stream, wherein each inter-encoded frame of the enhanced layer refers to the intra-encoded frame of the base layer or to another inter-encoded frame of the enhanced layer.

* * * * *